United States Patent [19]

Little

[11] 4,216,941
[45] Aug. 12, 1980

[54] YOKE HOIST FOR USE WITH PICKUP TRUCK

[76] Inventor: Raymond L. Little, 1723 Oak Lake, Irving, Tex. 75060

[21] Appl. No.: 907,987

[22] Filed: May 22, 1978

[51] Int. Cl.² ............................................. B66C 23/60
[52] U.S. Cl. ................................... 254/326; 212/265; 414/563; 52/632
[58] Field of Search ............................ 254/139.1, 139; 212/8 R, 65, 55, 9; 214/86 A, 75 H, 523, 77 P, 77 R; 52/123, 122, 146; 403/205, 235; 414/563

[56] References Cited

U.S. PATENT DOCUMENTS

| | | | |
|---|---|---|---|
| 1,704,882 | 3/1929 | Coantryman | 214/86 A |
| 2,541,970 | 2/1951 | Pospisil | 254/139.1 |
| 2,746,717 | 5/1956 | Powers | 254/139.1 |
| 2,919,107 | 12/1959 | Halbrook et al. | 254/139.1 |
| 2,977,079 | 3/1961 | Calandra | 254/139.1 |
| 3,167,200 | 1/1965 | Booker | 254/139.1 |
| 4,049,238 | 9/1977 | Brown | 254/139.1 |

*Primary Examiner*—Kenneth W. Noland
*Attorney, Agent, or Firm*—William L. Martin, Jr.; Peter J. Thoma; Robert W. Turner

[57] ABSTRACT

A hoist device is pivotally attached to a specially adapted rear bumper of a conventional pickup truck. The hoist comprises a generally yoke-shaped frame adapted to wrap around the rearmost ends of the truck's cargo bed such that the hoist, when not in use, will not substantially interfere with the use of and access to the cargo bed.

4 Claims, 4 Drawing Figures

U.S. Patent  Aug. 12, 1980  4,216,941
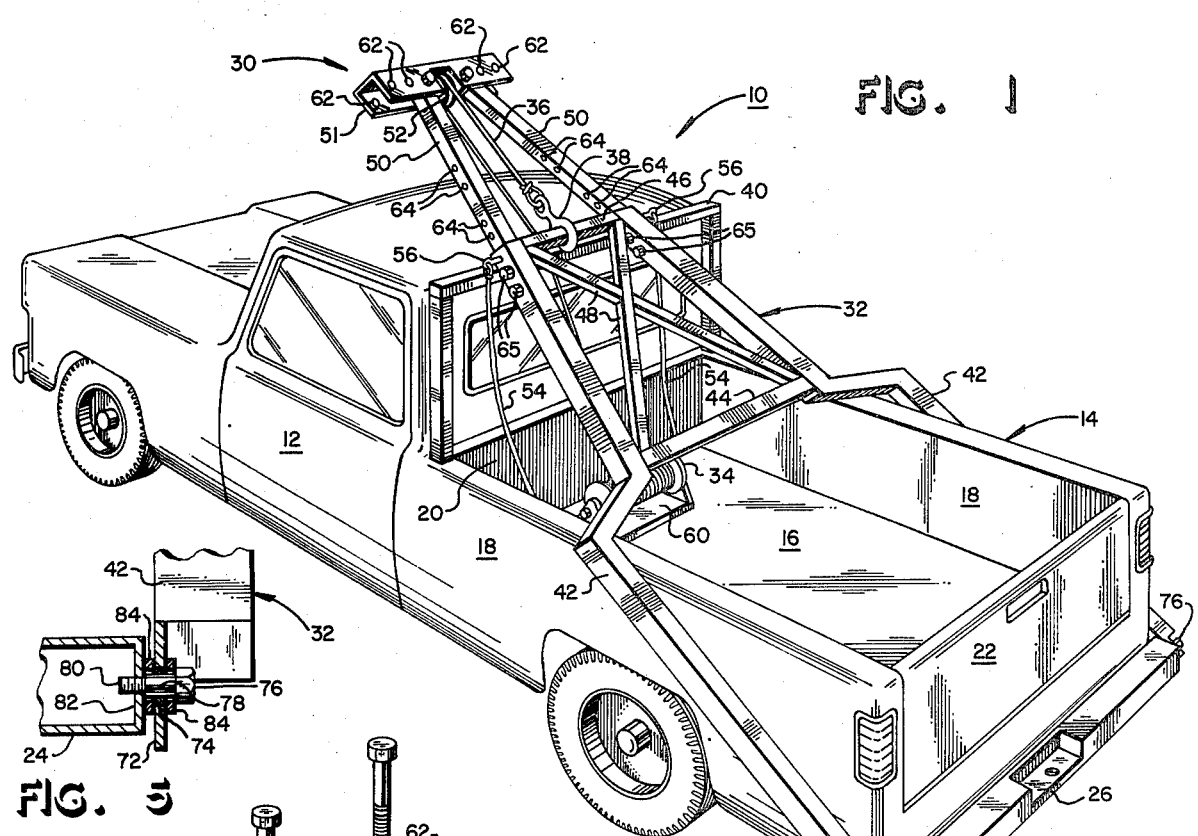
FIG. 1
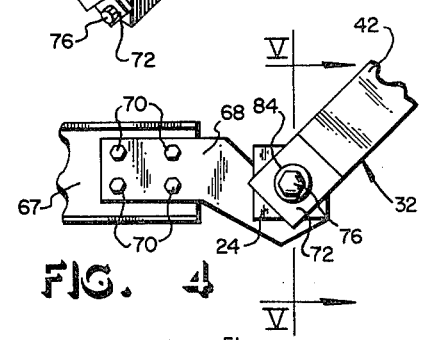
FIG. 5
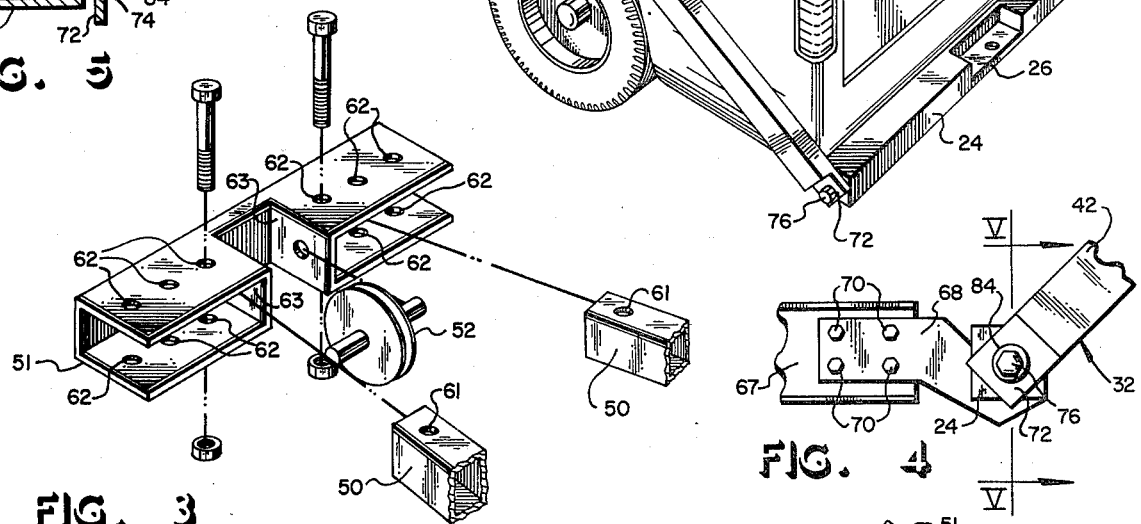
FIG. 3
FIG. 4
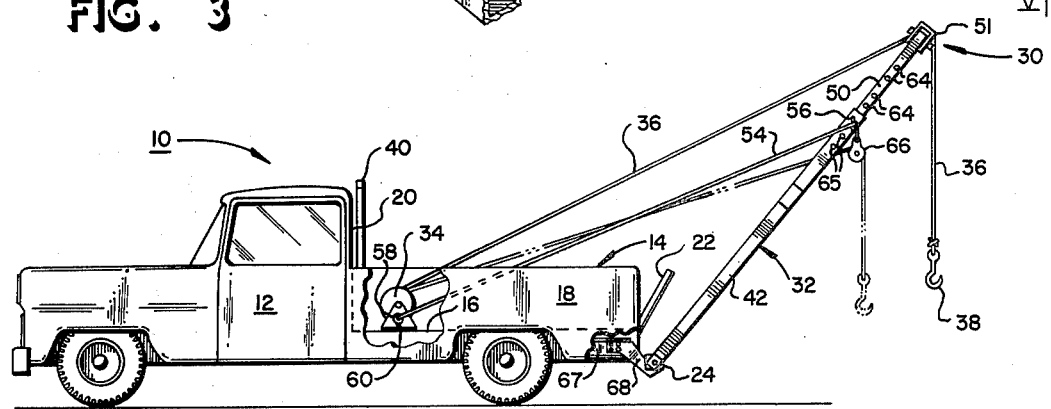
FIG. 2

YOKE HOIST FOR USE WITH PICKUP TRUCK

BACKGROUND OF THE INVENTION

The present invention pertains generally to hoist trucks, and more particularly to an improved hoist assembly mountable on a conventional pickup truck in such manner as to avoid interference with the cargo-carrying capacity thereof.

A hoist or gin pole truck is a very specialized vehicle whose use is usually limited to the lifting and transporting of heavy objects for short distances. In all but the most active operations, such hoist trucks are idle a majority of the time, therefore yielding an undesirably low return on capital investment. Thus, it would be desirable to provide a vehicle having the capabilities of a conventional hoist or gin pole truck yet with the added utility of a cargo carrier as, for example, a conventional pickup truck. No known prior art vehicle achieves such a dual function in a satisfactory and economical manner.

The following patents are representative of the prior art: Sears, U.S. Pat. No. 3,115,256; Proctor, U.S. Pat. No. 2,843,360; Garnett et al., U.S. Pat. No. 2,715,014; Miller et al., U.S. Pat. No. 3,111,225; Burkland, U.S. Pat. No. 3,980,276; Powers, U.S. Pat. No. 2,746,717; Troche et al., U.S. Pat. No. 2,611,580.

Of the above-cited references, only Burkland describes a hoist device for installation on an ordinary pickup truck. The Burkland device, however, is employed at the front of the truck by attachment to a specially adapted front bumper, thus requiring removal of the device prior to resuming ordinary transport operations with the truck. Furthermore, the Burkland hoist device can only be used while the vehicle is stationary, thus being clearly incapable of towing and similar operations.

The remaining cited refernces describe special purpose vehicles with hoist equipment or the like that substantially interferes with the vehicles cargo-carrying capacity, some to a much greater extent than others. Each such vehicle has interfering equipment either above the entire length of the potential storage area, or within the sidewalls thereof, or both. The vehicle described by Sears provides a hoist device which, by comparison to the others, interferes least with the cargo area; yet, because it does not show side panels and a tail gate characteristic of a conventional pickup truck, its versitility as a cargo-carrying vehicle is limited.

SUMMARY OF THE INVENTION

It is therefore a primary object of the present invention to provide a hoist device installable at the rear of a vehicle of the type having a partially enclosed cargo bed, as in a conventional pickup truck.

It is another object of the present invention to provide a versatile vehicle suitable for cargo transportation and hoisting operations, and equipped with a hoist, a winch, and means for supporting the hoist in both working and transport positions without substantial interference with the cargo-carrying capacity of the vehicle.

It is a further object of the present invention to provide a simple and inexpensive hoist device including a specially adapted supporting bumper for installation at the rear of a conventional pickup truck.

These and other objects and advantages are accomplished in accordance with the present invention by providing a vehicle having a partially enclosed cargo bed including at least upstanding sidewalls, the vehicle being modified rearward of the cargo bed to pivotally support a frame of a hoist assembly in a plurality of positions including a transport position wherein the frame extends generally forward from its pivotal attachment and at least one working position wherein the frame extends generally rearward from its pivotal attachment. The frame is generally yoke-shaped and comprises a pair of legs adapted to extend forward from the pivotal attachment around and beyond the outside of the sidewalls whereupon the legs converge above the forward area of the cargo bed to permit access from above to at least about the rearward half of the cargo bed when the frame is in the transport position. The frame further includes brace members for reinforcing the upper ends of the legs and provisions for a pulley assembly or the like for use with a conventional hoist or winch cable. Additionally, supporting members are provided for suspending the frame in the working position to permit hoisting of objects at the rear of the truck.

Other advantages and novel features of the present invention may be best understood by reference to the following detailed description of an illustrative embodiment and the accompanying drawing.

BRIEF DESCRIPTION OF THE DRAWING

FIG. 1 is a schematic perspective view of a conventional pickup truck as modified in accordance with the present invention embodying a preferred hoist shown in its transport position;

FIG. 2 is a schematic side elevational view of the truck of FIG. 1 with portions of its left side panel broken away and showing the hoist in a working position;

FIG. 3 is an enlarged exploded perspective view of an upper portion of the hoist;

FIG. 4 is an enlarged view of a preferred chassis support arrangement for the hoist; and FIG. 5 is a schematic sectional view along line V—V of FIG. 4 illustrating a preferred mounting arrangement for the hoist.

DESCRIPTION OF THE PREFERRED EMBODIMENTS

Referring now to the figures wherein like numerals designate like parts, a preferred embodiment of the invention will be described in detail. With particular reference to FIGS. 1 and 2, a cargo transporting and service vehicle equipped in accordance with the invention is illustrated and designated generally by reference numeral 10. The vehicle 10 preferably comprises a conventional pickup truck 12 having a cargo area or bed 14, which is formed by a bottom 16, sidewalls or panels 18, a cab wall 20 and a tailgate 22. It will be understood that the cargo bed 14 and other features of the truck 12 are of any conventional type or design with minor modifications required for the hoist assembly installation hereinafter described.

As best seen in the view of FIG. 1, the rearward end of the truck 12 is provided with a specially adapted rear bumper bar 24, which is slightly longer than the width of the truck 12. The bumper bar 24 can be mounted on the truck 12 in accordance with known techniques used in the mounting of conventional heavy duty trailer hitches, and optionally can be provided with a suitable hitch area 26. A hoist assembly, generally designated by reference numeral 30, comprises: a yokeshaped frame 32 pivotally attached to the ends of the bumper bar 24, a conventionally driven winch 34 forwardly mounted in the cargo bed 14, and a winch cable 36 having a hook 38 at the free end thereof for attachment to the object to be hoisted. It will be appreciated that the special yoke shape of the frame 32 as seen in FIG. 1 enables the truck 12 to be used to carry cargo without removing the hoist 30 from the truck 12. When not in use, the frame 32 can be carried in a forward position, hereinafter referred to as the transport position, wherein a suitable rest or rack 40, commonly referred to as a headache rack, supports the frame 32 just to the rear and above the cab wall 20.

In accordance with a unique and important feature of the present invention, the frame 32 comprises a pair of legs 42 adapted to extend from the bumper bar 24 forward around the outside of the side panels 18 and then converge above the cargo bed 14 so as not to interfere with the use of at least the rearmost area of the cargo bed 14. At a point where the frame 32 extends above the side panels 18 as seen in FIG. 1, the legs 42 converge at first sharply to a lower cross brace 44 and then gradually to an upper cross brace 46. It will be appreciated that by attaching the hook 38 to the upper cross brace 46, the winch 34 can be used to hold the frame 32 in the transport position by applying an appropriate tension to the cable 36. Optional diagonal struts 48 can be employed as shown between the braces 44 and 46 in a conventional manner for added reinforcement. The upper gradually converging portions of the legs 42 are adpated to receive telescoping frame members or columns 50, which are secured at their upper ends within a specially adapted U-shaped bracket 51. The details of the bracket 51 and its unique operation will be described more fully below in conjunction with FIG. 3. Mounted in the bracket 51 between the columns 50 is a suitable pulley 52 of conventional construction.

In accordance with another important feature of the invention, the frame 32 can be deployed rearward from the truck 12 at various angles, hereinafter referred to as working positions, one of which is specifically illustrated in FIG. 2. The angle of deployment of the frame 32 is selectively controlled using a pair of guy-wires 54, each of which is preferably secured between one of two eyebolts 56 extending outwardly from the sides of the frame 32 near the upper cross brace 46 and a corresponding one of two eyebolts 58 secured in the bed 14 at opposite sides of the winch 34 in a winch mounting bracket 60 adapted for such purpose. Most preferably, discrete lengths of cable (not shown) are used in various combinations with conventional quick disconnects to selectively vary the guy-wire length to achieve a desired angle of deployment.

Now referring to FIG. 3, the manner in which the overall length of the frame 32 is varied will be described. It will, of course, be understood that this operation is best carried out with the frame 32 pivoted rearward to rest on the ground or on a suitable work surface at a convenient height. Nevertheless, for convenience of illustration and explanation, the view of FIG. 3 is taken in generally the same orientation as FIG. 1. Thus, it will be readily apparent that the upper ends of the columns 50 are slideable within the U-shaped bracket 51 to permit them to be extended by varied amounts from the upper ends of the legs 42 thereby producing a varied relative spacing of the upper ends of the channel 50. The relationship between the amount of extension of the channels 50 and their relative spacing is a function of the angle of convergence of the upper ends of legs 42 from which the channels 50 telescopically extend. By way of example, each channel 50 can be positioned at three different locations by aligning holes 61 in the ends of the channels 50 with holes 62 in the bracket 51 and then can be secured in place using conventional hardware, as depicted. Thus, three spacings of the upper ends of the channels 50 are achievable while maintaining symmetry and balance. An additional advantageous feature of the bracket 51 is the provision of inner walls 63 for receiving therebetween and supporting the pulley 52 independently of the mounting and relative spacing of the channels 50.

With the foregoing explanation of the function of the bracket 51 in mind, it will be appreciated that the overall length of the frame 32 can be varied by sliding the channels 50 within the upper ends of the legs 42 to any one of three predetermined positions corresponding to the three balanced spacings of the upper ends of the channels 50 permitted by the bracket 51. FIG. 1 illustrates the channels 50 in the most extended of the three possible positions. Pairs of holes 64, which are provided at three locations on each channel 50 are alignable with corresponding holes in the legs 42 through which lock pins 65 are inserted to secure the channels 50 in position within the legs 42.

Referring again to FIG. 2, it will be appreciated that the hoist 30 can be adapted for use without the telescoping channels 50, bracket 51 and pulley 52. In particular, a conventional pulley 66 can be hung in a suitable manner from the upper cross brace 46 for supporting the cable and hook shown in phantom, thereby providing a simplified hoist arrangement having nonvariable frame length.

Now referring to FIG. 4, a preferred technique for attaching the bumper bar 24 to the truck 12 will be described. The figure shows the rearmost portion of a left I-beam 67, which is representative of conventional automotive chassis construction. It will be appreciated that most American-made pickup trucks have a chassis that includes a pair of I-beams extending the full length of the truck. A specially adapted bracket 68 is attached preferably by bolts 70 to the I-beam 67 and extends rearwardly out to cradle the bumper bar 24 in the manner depicted. In like manner, but not shown in the figure an additional bracket extends from a similar I-beam at the right side of the truck 12. Both the left bracket 68 and its hidden right counterpart are preferably attached to the bumper bar 24 by welding. Optionally, it may be desirable to provide a cross brace (not shown) between I-beams at the rear of the truck chassis in a manner known to those skilled in the art of installing trailer hitches.

Now referring to FIG. 5, a preferred pivotal attachment of the hoist frame 32 to one side of the bumper bar 24 will be described. The lower end of the frame 32 is equipped with a flange 72 having a suitable bearing 74 centrally disposed therein. A specially adapted bolt 76 having a raised annular shoulder 78 and threaded end 80 passes through the flange 72 and is secured in an end wall 82 of the bumper bar 24. The shoulder 78 provides a smooth shaft-like surface about which the bearing 74 rotates when the frame 32 is pivoted. Washers 84 are disposed on opposite sides of the flange 72 around the shoulder 78 to facilitate the pivotal movement of the flange 72 by eliminating interference with the bolt 76 and the end wall 82. With a similar arrangement at the opposite end of the bumper bar 24, an inexpensive and effective mechanism is provided for pivoting the frame 32 from the transport position to a working position and vice sersa. Furthermore, it will be appreciated that such an arrangement facilitates removal and reinstallation of the hoist frame 32 from the truck 12 as desired.

Although a preferred embodiment of the invention has been described in detail, it is to be understood that various changes and substitutions can be made without departing from the spirit and scope of the invention as defined by the appended claims.

What is claimed is:

1. A hoist assembly for use with a conventional pickup truck or the like having a cargo bed partially enclosed by upstanding sidewalls, the hoist assembly comprising:

a generally yoke-shaped frame pivotally attached to the rearward end of the truck to permit the frame to be carried in a plurality of positions including a transport position wherein the frame extends generally forward from its pivotal attachment and at least one working position wherein the frame extends generally rearward from its pivotal attachment, the frame comprising a pair of legs adapted to extend forward from the pivotal attachment around and beyond the outside of the sidewalls whereupon the legs converge above the forward area of the cargo bed so as to permit access from above to at least about the rearward half of the cargo bed when the frame is in the transport position, the frame further including means at the upper end thereof for attaching a pulley and means for bracing the upper ends of the legs;

means for suspending the frame in the working position to permit hoisting of the objects at the rear of the truck; and a bumper bar secured to the rearward end of the truck and means for pivotally attaching the frame to the outermost ends of the bumper bar;

and wherein:

the frame is generally symmetrical about the longitudinal axis of the truck and lies in a plane pivotable about the longitudinal axis of the bumper bar;

the pulley attaching means comprises telescoping channels adapted to slidably extend from upper converging portions of the frame legs to permit selective adjustment of the overall length of the frame; and the telescoping channels are secured at their upper ends by a generally U-shaped bracket, the bracket including means for securing the upper ends of the channels at balanced spacings from both sides of a center position of the generally U-shaped bracket, said balanced spacings corresponding to predetermined amounts of telescopic extension.

2. The hoist assembly of claim 1 wherein the suspending means comprises a pair of guy-wires, each of which is secured between the upper end of a frame leg and a point in the cargo bed.

3. The hoist assembly of claim 2 further comprising a winch assembly forwardly mounted in the cargo bed, wherein the guy wires are secured at opposite sides of the winch assembly.

4. The hoist assembly of claim 3 further comprising means for securing the frame in the transport position.

* * * * *